United States Patent
Lee et al.

(10) Patent No.: US 9,457,502 B2
(45) Date of Patent: *Oct. 4, 2016

(54) METHOD OF PREPARING ALUMINUM-RESIN COMPLEX

(71) Applicant: ILKWANGPOLYMER CO., LTD., Goyang-si, Gyeonggi-do (KR)

(72) Inventors: Eun Kyung Lee, Goyang-si (KR); Yong Wan Jo, Iksan-si (KR)

(73) Assignee: ILKWANGPOLYMER CO., LTD., Goyang-si (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/597,160

(22) Filed: Jan. 14, 2015

(65) Prior Publication Data

US 2016/0067894 A1    Mar. 10, 2016

(30) Foreign Application Priority Data

Sep. 4, 2014 (KR) .................. 10-2014-0117815

(51) Int. Cl.
| | | |
|---|---|---|
| B29C 45/14 | (2006.01) | |
| C23F 1/20 | (2006.01) | |
| C23F 1/36 | (2006.01) | |
| B29K 705/02 | (2006.01) | |
| B29K 67/00 | (2006.01) | |
| B29K 105/20 | (2006.01) | |

(52) U.S. Cl.
CPC .......... *B29C 45/14311* (2013.01); *C23F 1/20* (2013.01); *C23F 1/36* (2013.01); *B29C 45/14778* (2013.01); *B29C 2045/14868* (2013.01); *B29K 2067/006* (2013.01); *B29K 2105/20* (2013.01); *B29K 2705/02* (2013.01)

(58) Field of Classification Search
None
See application file for complete search history.

(56) References Cited

U.S. PATENT DOCUMENTS

| | | | | |
|---|---|---|---|---|
| 3,802,973 A | * | 4/1974 | Smith | C23F 1/36 216/103 |
| 4,915,782 A | * | 4/1990 | Coggins | C23F 1/20 216/102 |
| 5,387,361 A | * | 2/1995 | Kohara | C23F 1/20 216/102 |
| 6,849,138 B1 | * | 2/2005 | Kamiyama | C23C 22/68 148/264 |
| 7,640,646 B2 | * | 1/2010 | Naritomi | B29C 45/14311 29/458 |
| 8,367,210 B2 | * | 2/2013 | Naritomi | 148/275 |
| 8,858,854 B2 | * | 10/2014 | Oin | B29C 45/14311 264/241 |
| 2009/0274889 A1 | * | 11/2009 | Iwahashi | B29C 45/14311 428/312.8 |
| 2010/0230631 A1 | * | 9/2010 | Tago | C23F 1/20 252/79.4 |

FOREIGN PATENT DOCUMENTS

| | | |
|---|---|---|
| KR | 1020100063152 A | 6/2010 |
| KR | 1020140035926 A | 3/2014 |

* cited by examiner

*Primary Examiner* — Anita Alanko
(74) *Attorney, Agent, or Firm* — Alleman Hall McCoy Russell & Tuttle LLP

(57) ABSTRACT

Provided is a method of preparing an aluminum-resin complex in which an aluminum alloy and a resin composition are integrated with each other. More particularly, the present invention is relates to a method of preparing an aluminum-resin complex having improved bonding strength by preparing an aluminum alloy having a more uniform etching surface using an alkaline aqueous solution to which a chelating agent and a cycloamine are added and an acidic aqueous solution to which a chelating agent is added and injection-molding a resin composition using the aluminum alloy.

7 Claims, 3 Drawing Sheets

METHOD OF PREPARING ALUMINUM-RESIN COMPLEX

CROSS-REFERENCE TO RELATED APPLICATIONS

This application claims priority under 35 U.S.C. §119 to Korean Patent Application No. 10-2014-0117815, filed on Sep. 4, 2014, in the Korean Intellectual Property Office, the disclosure of which is incorporated herein by reference in its entirety.

TECHNICAL FIELD

The following disclosure relates to a method of preparing an aluminum-resin complex in which an aluminum alloy and a resin composition that are heterogeneous materials are integrated with each other, more particularly to a method of preparing an aluminum-resin complex having improved bonding strength by preparing an aluminum alloy having a more uniform and finer etching surface using an alkaline aqueous solution to which a chelating agent and a cycloamine are added and an acidic aqueous solution to which a chelating agent is added, and injection-molding a resin composition using the aluminum alloy.

BACKGROUND

A technology of integrating a metal alloy material and a resin material, which are heterogeneous materials, using an adhesive has been used in various fields such as automobiles, electronic products, industrial equipment, and the like, but in a method using the adhesive, there are problems in that precise bonding is difficult, a curing time is long, and maintenance and management of a state of the adhesive is difficult.

For these reasons, according to the related art, methods of bonding the metal alloy material and the resin material, which are heterogeneous materials, without using an adhesive, have been studied. As one of the methods, a nano method has been actively studied.

A technology of bonding heterogeneous materials using the nano method, which is a technology of forming a groove in a surface of a metal alloy material at a nano size to insert a resin material thereinto, has an advantage in that tensile force is higher than in a case of using an adhesive.

However, when the metal-resin complex is exposed to a harsh environment, bonding strength of the metal-resin complex is not sufficient, such that a metal-resin complex having more excellent bonding strength should be developed.

RELATED ART DOMCUMENT

Patent Document

Korean Patent Laid-Open Publication No. 10-2014-0035926
Korean Patent Laid-Open Publication No. 10-2010-0063152

SUMMARY

An embodiment of the present invention is directed to providing a method of preparing an aluminum-resin complex having improved bonding strength by preparing an aluminum alloy having a more uniform and finer etching surface using an alkaline aqueous solution to which a chelating agent and a cycloamine are added and an acidic aqueous solution to which a chelating agent is added, and injection-molding a resin composition using the aluminum alloy.

In one general aspect, a method of preparing an aluminum-resin complex includes:

preparing an aluminum alloy material having an etched surface; and injection-molding a resin composition on the etched surface of the aluminum alloy material to thereby be integrated with each other, wherein the preparing of the aluminum alloy material includes:

i) a primary processing process of treating the aluminum alloy material with an alkaline aqueous solution to which a chelating agent and a cycloamine are added; and ii) a secondary processing process of treating the aluminum alloy material with an acidic aqueous solution to which a chelating agent is added.

Holes of the etched surface of the aluminum resin alloy material may have an average inner diameter of 0.1 to 10 μm, and an average surface roughness of the etched surface may be 50 to 200 μm.

The chelating agent may be added in a range of 0.001 to 0.5 parts by weight based on 100 parts by weight of the alkaline or acidic aqueous solution.

The cycloamine may be added in a range of 0.001 to 0.2 parts by weight based on 100 parts by weight of the alkaline aqueous solution.

The primary processing process, the secondary processing process, or the primary and secondary processing processes may become a unit process, and the unit process may be repetitively performed one time or more.

In the primary processing process, a concentration of the alkaline aqueous solution may be 1 to 10 wt %, a temperature may be 30 to 70° C., and a processing time may be 30 seconds to 2 minutes.

In the secondary processing process, a concentration of the acidic aqueous solution may be 5 to 30 wt %, a temperature may be 40 to 80° C., and an etching time may be 1 to 5 minutes.

The preparing of the aluminum alloy material may further include a degreasing process as a pre-process of the primary processing process.

Hereinafter, each component of the present invention will be described in detail.

First, the aluminum alloy according to the present invention will be described.

The aluminum alloy used in the present invention may be divided into a non-heat treatment type alloy and a heat-treated alloy. As the non-heat treatment type alloy, which is to increase hardness and tensile strength only at the time of work-hardening, there are an Al—Mg based alloy, an Al—Mn based alloy, an Al—Mg—Mn based alloy, and the like, and as the heat-treated alloy, which is to improve mechanical properties through heat-treatment, there are an Al—Cu—Mg based alloy, an Al—Zn—Mg based alloy, an Al—Mg—Si based alloy, a heat-resistant aluminum alloy, and the like.

As the aluminum alloy used in the present invention, all of the commercially available aluminum or aluminum alloys, for example, A5052, A3003, A6063, and the like, may be used, but the present invention is not limited thereto.

In addition, as the aluminum alloy applied to Examples of the present invention, an aluminum alloy processed as a component structure by mechanically processing an intermediate aluminum raw material having a plate shape, a bar shape, a pipe shape, or the like, before processing, using a cutting processing method, a drawing processing method, a milling processing method, an electrical discharge processing method, a press processing method, a grinding processing method, a polishing processing method, or the like, may be used.

The component structure may be injected into an injection-molding mold to thereby be processed as a component having a shape and structure suitable for a specific product.

Next, a degreasing process according to the present invention will be described.

In general, foreign materials and oil components are adhered to a surface of a processed aluminum alloy, and these foreign materials and oil components need to be removed. In this case, at the time of removing the foreign materials and oil components, a neutral detergent may be used, or an ultrasonic degreasing method or electrolytic degreasing method may be used.

As the neutral detergent, a detergent for an aluminum alloy has been sold on the market, but a dish detergent (containing a surfactant) used ordinarily in homes may be used. In this case, it is preferable to clearly remove a dish detergent component after use. The reason is that in the case in which the dish detergent component remains, the primary and secondary processing processes may be inhibited.

Next, the primary processing process according to the present invention will be described.

In the present invention, the primary processing process, which is to remove a protective film such as an aluminum oxide film, or the like, and activate the surface, allows an acid to be uniformly reacted in the subsequent secondary processing process and decreases a process time.

The primary processing process is a step of removing an oxide film, or the like, of the aluminum alloy using the alkaline aqueous solution to which the chelating agent and the cycloamine are added, and a processing method is not particularly limited. For example, the oxide film, or the like, may be removed by dipping the aluminum alloy in the alkaline aqueous solution to which the chelating agent and the cycloamine are added or allowing the alkaline aqueous solution to flow on the aluminum alloy.

In addition, it is preferable that in the primary processing process, a concentration of the alkaline aqueous solution is in a range of 1 to 10 wt %, a solution temperature is in a range of 30 to 70° C., and a processing time is in a range of 30 seconds to 2 minutes. The protective film such as the aluminum oxide film, or the like, may be effectively removed within the above-mentioned ranges.

The alkaline aqueous solution is not particularly limited, but a sodium hydroxide aqueous solution, a potassium hydroxide aqueous solution, or a magnesium hydroxide aqueous solution may be used.

In the present invention, the chelating agent is added in a range of 0.001 to 0.5 parts by weight, preferably 0.005 to 0.2 parts by weight, and more preferably, 0.01 to 0.1 parts by weight based on 100 parts by weight of the alkaline aqueous solution. The protective film such as the aluminum oxide film, or the like, may be more effectively and rapidly removed within the above-mentioned range.

The chelating agent is not particularly limited as long as it is generally used. For example, ethylenediaminetetraacetic acid (EDTA), diethylenetriaminepentaacetic acid (DTPA), nitrilotriacetic acid (NTA), (2-hydroxyethyl)-ethylenediaminetriacetic acid (HEDTA) ethylenebis(oxyethylenenitrilo) tetraacetic acid (EGTA), or the like, may be used.

In the present invention, it is preferable that the cycloamine is added in a range of 0.001 to 0.2 parts by weight based on 100 parts by weight of the alkaline aqueous solution. It is considered that the cycloamine assists in effectively removing the protective film such as the oxide film, or the like, within the above-mentioned range and forms a more fine and uniform etching surface in the subsequent secondary processing process to thereby allow significantly excellent adhesion strength. In addition, the cycloamine prevents defects such as a void, or the like, from being formed in a bonding surface at the time of injection-molding and bonding a resin.

The cycloamine is not particularly limited. For example, pyrrolidine, 1-methylpyrrolidine, piperidine, 1-methylpiperidine, 4-benzyl-1-hexylpiperidine, piperazine, 1-(3-methylbenzyl)piperazine, 1,2-dimethylpiperazine, 1-(1-pentyl)piperazine, or the like, may be used, but the present invention is not limited thereto.

Thereafter, the secondary processing process according to the present invention will be described.

In the present invention, the secondary processing process is a step of forming an etching surface in the surface of the aluminum alloy, and although not particularly limited, the etching surface may have an average inner diameter of 0.1 to 10 μm and an average surface roughness of 50 to 200 μm. An anchor effect is high in the above-mentioned average inner diameter and average surface roughness ranges, such that adhesion force is excellent, and strength of the aluminum alloy itself is not deteriorated.

The secondary processing process is to form the etching surface in the surface of the aluminum alloy using the acidic aqueous solution to which the chelating agent is added, and a processing method is not particularly limited. For example, the etching surface may be formed by dipping the aluminum alloy into the acidic aqueous solution or allowing the acidic aqueous solution to flow on the aluminum alloy.

In addition, it is preferable that in the secondary processing process, a concentration of the acidic aqueous solution is in a range of 5 to 30 wt %, a solution temperature is in a range of 40 to 80° C., and a processing time is in a range of 1 to 5 minutes. Within the above-mentioned ranges, bonding strength is excellent, and the secondary processing process does not significantly affect a thickness of the aluminum alloy.

The acidic aqueous solution is not particularly limited, but hydrochloric acid, nitric acid, sulfuric acid, or formic acid may be used.

In the present invention, the chelating agent is added in a range of 0.001 to 0.5 parts by weight, preferably 0.005 to 0.2 parts by weight, and more preferably, 0.01 to 0.1 parts by weight based on 100 parts by weight of the acidic aqueous solution. The etching surface may be more uniformly formed in the above-mentioned range, such that bonding strength is improved, and there is no defect such as a void, or the like, in the bonding surface at the time of injection-molding and bonding the resin.

The chelating agent is not particularly limited as long as it is generally used. For example, ethylenediaminetetraacetic acid (EDTA), diethylenetriaminepentaacetic acid (DTPA), nitrilotriacetic acid (NTA), (2-hydroxyethyl)-ethylenediaminetriacetic acid (HEDTA) ethylenebis(oxyethylenenitrilo) tetraacetic acid (EGTA), or the like, may be used, and the chelating agent added to the acidic aqueous solution equal to or different from the chelating agent added to the alkaline aqueous solution may be selected and used.

Next, the resin composition according to the present invention will be described.

In the present invention, the resin material is not particularly limited. For example, it is preferable that a polyamide (PA) resin such as nylon 6, nylon 66, and the like, a polyphthalamide (PPA) resin, a polybutylene terephthalate (PBT) resin, or a polyphenylene sulfide (PPS) resin is used, and one resin may be used alone or a combination of two or more resins may be used. In the case of using the combination of two or more resins, all combinations in which two or more resins are simply mixed with or molecularly bonded to each other may be used.

In addition, the aluminum-resin complex according to the present invention may further contain 1 to 200 parts by weight, more preferably, 10 to 150 parts by weight of a filler based on 100 parts by weight of the total resin material in order to adjust a difference in linear coefficient of expansion between an aluminum alloy part and a resin part and improve mechanical strength of the resin part.

As the filler, there are a fibrous filler, a granular filler, a plate-like filler, and the like. As the fibrous filler, there are glass fiber, carbon fiber, aramid fiber, and the like, and as a specific example of the glass fiber, there is a chopped strand having an average fiber diameter of 6 to 14 μm. As the granular filler or plate-like filler, there are calcium carbonate, mica, glass flake, glass balloon, magnesium carbonate, silica, talc, clay, a crushed material of carbon fiber or aramid fiber, and the like.

Next, the injection-molding according to the present invention will be described.

After preparing an injection-molding mold, opening an upper mold (movable mold), and injecting the processed aluminum alloy component structure into a lower mold (fixed mold), the upper mold is closed.

Thereafter, in the case of injection-molding the prepared resin composition using the mold, the aluminum alloy and the resin composition, which are heterogeneous materials, are bonded to each other, such that the aluminum-resin complex in which the aluminum alloy and the resin composition are integrated with each other may be obtained.

In order to increase bonding force, it is preferable that a mold temperature is raised to be higher than a temperature for molding a general resin material. Therefore, the mold temperature is changed depending on the kind of resin, but in general, it is preferable that the mold temperature is 120 to 350° C.

Other features and aspects will be apparent from the following detailed description, the drawings, and the claims.

DETAILED DESCRIPTION OF EMBODIMENTS

Hereinafter, a method of preparing an aluminum-resin complex according to the present invention will be described in more detail through the following Examples. However, the following Examples are only to specifically explain the present invention, but the present invention is not limited thereto and may be implemented in various forms.

In addition, unless defined otherwise in the specification, all the technical and scientific terms used in the specification have the same meanings as those that are generally understood by those who skilled in the art. The terms used in the specification are only to effectively describe a specific exemplary embodiment, but are not to limit the present invention.

Further, the accompanying drawings to be described below are provided by way of example so that the idea of the present invention can be sufficiently transferred to those skilled in the art to which the present invention pertains. Therefore, the present invention is not limited to the drawings to be provided below, but may be modified in many different forms. In addition, the drawings to be provided below may be exaggerated in order to clarify the scope of the present invention.

In addition, unless the context clearly indicates otherwise, it should be understood that a term in singular form used in the specification and the appended claims includes the term in plural form.

Physical properties of aluminum alloys prepared in the following Examples and Comparative Examples were measure as follows.

(Measurement of Shear Fracture Force)

Shear fracture force of aluminum resin complexes prepared in the Examples was measured at a tensile speed of 10 mm/min using a universal tensile tester (Instron 3343).

Example 1

A commercially available A5052 aluminum alloy plate having a thickness of 1.0 mm was purchased and cut into rectangular pieces (14.0 mm×50.0 mm).

After forming a hole having a diameter of 6 mmΦ in an end portion of the cut aluminum alloy piece using a press, a jig made of a titanium wire was prepared, and 10 cut aluminum alloy pieces were seated on the jig made of the titanium wire so that they did not collide with each other.

Then, a solution in which 0.3 g of EDTA and 0.1 g of 1,2-dimethylpiperizine were added to 1 L of 5 wt % NaOH aqueous solution was prepared, and the aluminum alloy piece was dipped therein at a solution temperature of 50° C. for 1 minute and then washed.

After a primary processing process, a solution in which 0.3 g of EDTA was added to 1 L of 20 wt % HCl aqueous solution was prepared, and the aluminum alloy piece was dipped therein at a solution temperature of 60° C. for 3 minutes, washed, and dried.

Figure 1:
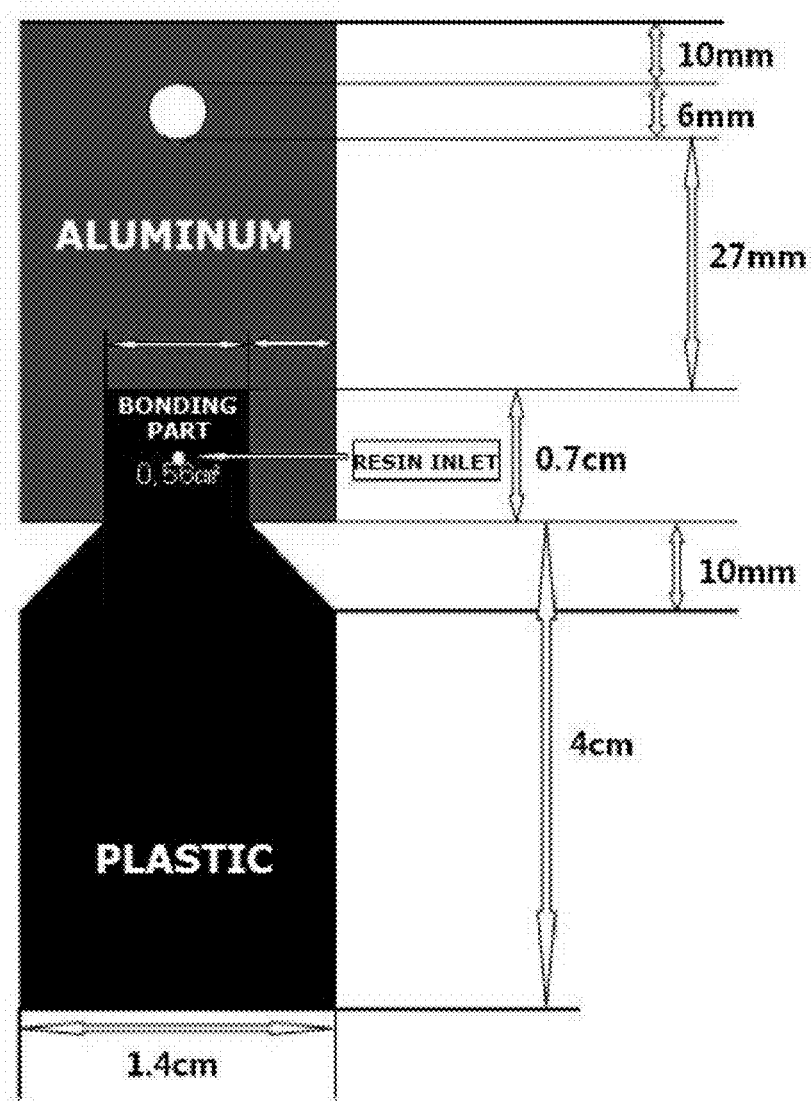
FIG. 1 is a cross-sectional view of an aluminum-resin complex according to an exemplary embodiment of the present invention.
Figure 2:
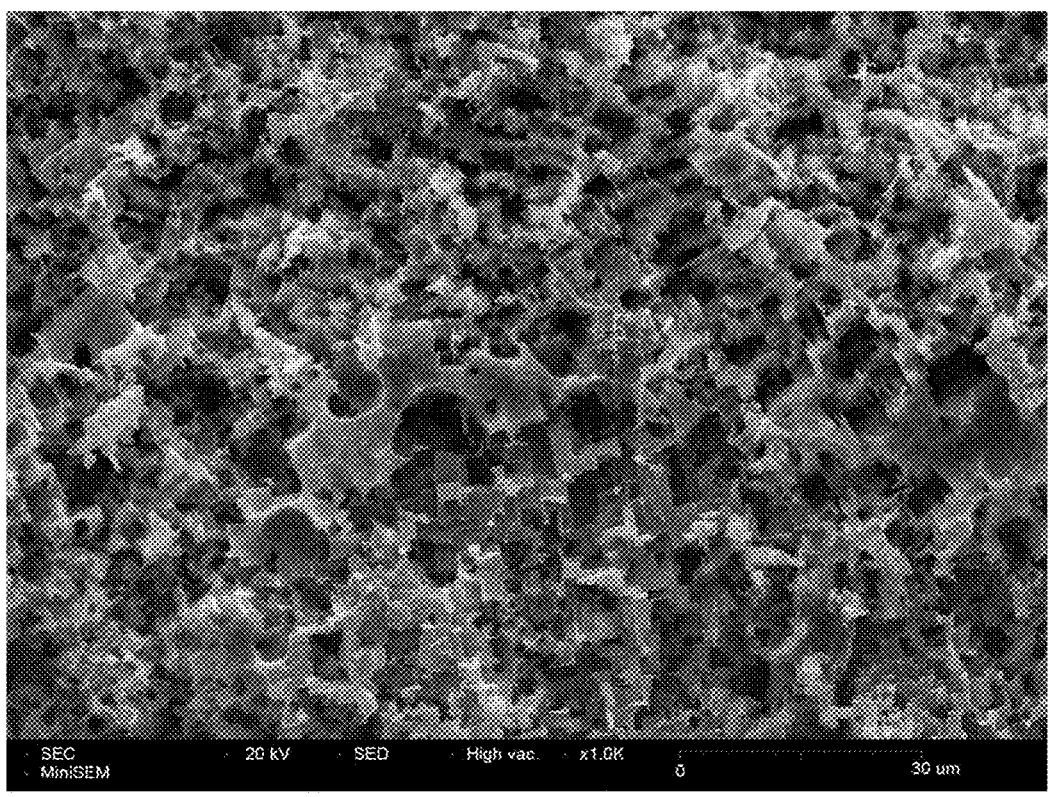
FIG. 2 is an enlarged photograph obtained by observing a surface of an aluminum alloy in Example 1 of the present invention using an electron microscope at a magnification of 1,000 after coating the surface with platinum so as to get a good view of the surface.
Figure 3:
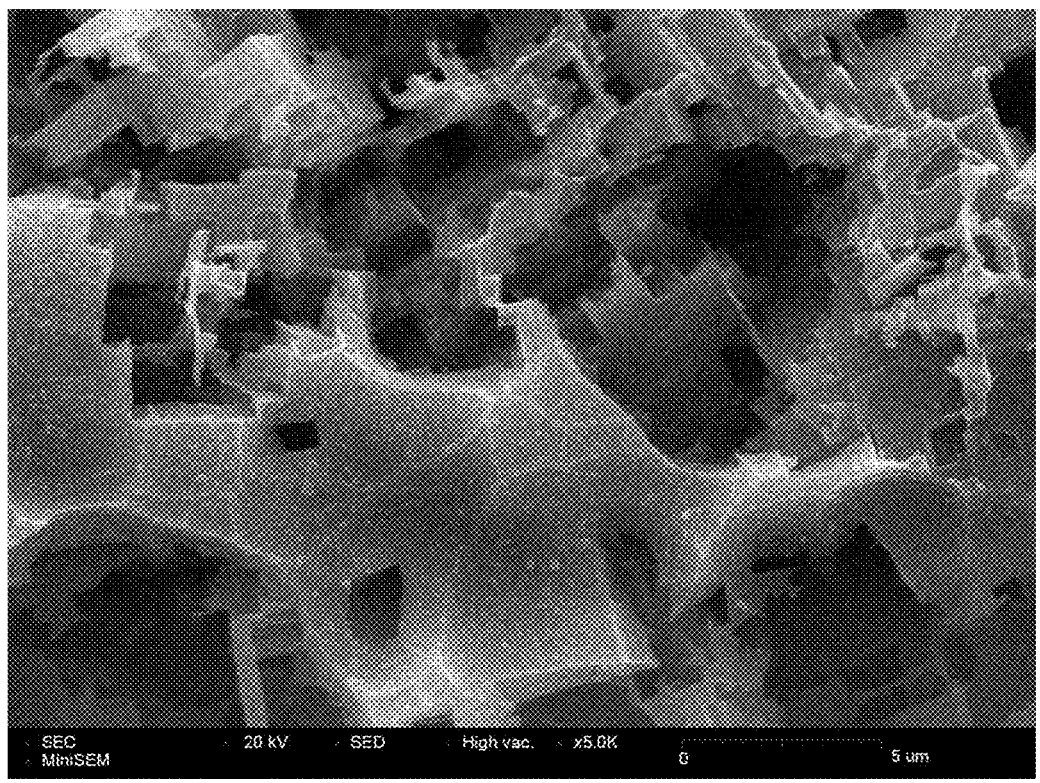
FIG. 3 is an enlarged photograph obtained by observing a surface of an aluminum alloy in Example 1 of the present invention using an electron microscope at a magnification of 5,000 after coating the surface with platinum so as to get a good view of the surface.

Next, after taking the obtained aluminum alloy piece out of the jig and putting and storing the aluminum alloy piece in a poly bag for 2 days, the stored aluminum alloy piece was picked out and injected using upper and lower molds of an injection-molding mold. Then, a polybutylene terephthalate resin (Toray Co. Ltd., 107G) was injection-molded using the mold, thereby obtaining a complex in which the aluminum alloy and the resin composition were integrated with each other. In this case, an injection temperature was 300° C., and a mold temperature was 180° C. Further, as shown in the cross-sectional view of FIG. 1, the prepared aluminum-resin complex had an aluminum alloy part (1.0 mm×50.0 mm×14.0 mm, thickness×length×width), a resin part (3.0 mm×47.0 mm×14.0 mm), and a bonding part (4.0 mm×7.0 mm×8.0 mm), and an area of the bonding part was 0.56 cm$^2$.

After 2 days, a tensile fracture test was performed on 10 samples using a tensile fracture tester, and as a result, average shear fracture force was 31.5 MPa.

Example 2

The same processes as those in Example 1 were performed except for conditions and numbers of the primary and secondary processing processes.

After a solution in which 0.3 g of EDTA and 0.1 g of 1,2-dimethylpiperizine were added to 1 L of 5 wt % NaOH aqueous solution was prepared, an aluminum alloy piece seated on the jig was dipped therein at a solution temperature of 50° C. for 1 minute and then washed.

After a primary processing process, a solution in which 0.3 g of EDTA was added to 1 L of 10 wt % HCl aqueous solution was prepared, and the aluminum alloy piece was dipped therein at a solution temperature of 60° C. for 1 minute and then washed.

The aluminum alloy piece subjected to a secondary processing process was repeatedly subjected to primary and secondary processing processes once more. The primary processing process was performed as described above, and the secondary processing process was performed as described above except that the aluminum alloy piece was dipped for 3 minutes, washed, and dried.

The same subsequent process as that in Example 1 was performed, such that a complex in which the aluminum alloy and the resin composition were integrated with each other was obtained.

After 2 days, a tensile fracture test was performed on 10 samples using a tensile fracture tester, and as a result, average shear fracture force was 32.0 MPa.

Example 3

The same processes as those in Example 1 were performed except for performing a degreasing process as a step before the primary processing process.

In the degreasing process, foreign materials such as oil components, or the like, were removed by immersing an aluminum alloy piece in a commercially available dish detergent (for example, PongPong) washing solution.

The same subsequent process as that in Example 1 was performed, such that a complex in which the aluminum alloy and the resin composition were integrated with each other was obtained.

After 2 days, a tensile fracture test was performed on 10 samples using a tensile fracture tester, and as a result, average shear fracture force was 32.2 MPa.

Comparative Example 1

The same processes as those in Example 1 were performed except that EDTA and 1,2-dimethylpiperazine were not added in the primary and secondary processing processes.

After 2 days, a tensile fracture test was performed on 10 samples using a tensile fracture tester, and as a result, average shear fracture force was 27.2 MPa.

Comparative Example 2

The same processes as those in Example 2 were performed except that EDTA and 1,2-dimethylpiperazine were not added in the primary and secondary processing processes.

After 2 days, a tensile fracture test was performed on 10 samples using a tensile fracture tester, and as a result, average shear fracture force was 27.3 MPa.

Comparative Example 3

The same processes as those in Example 1 were performed except that 1,2-dimethylpiperazine was not added in the primary processing process.

After 2 days, a tensile fracture test was performed on 10 samples using a tensile fracture tester, and as a result, average shear fracture force was 28.1 MPa.

Comparative Example 4

The same processes as those in Example 1 were performed except that EDTA was not added in the secondary processing process.

After 2 days, a tensile fracture test was performed on 10 samples using a tensile fracture tester, and as a result, average shear fracture force was 28.5 MPa.

In the method of preparing an aluminum-resin complex according to the present invention, bonding strength may be improved by preparing the aluminum alloy having the more uniform etching surface using the alkaline aqueous solution to which the chelating agent and the cycloamine are added and the acidic aqueous solution to which the chelating agent is added, and then injection-molding the resin composition using the aluminum alloy.

What is claimed is:

1. A method of preparing an aluminum-resin complex comprising:
   preparing an aluminum alloy material having an etched surface; and
   injection-molding a resin composition on the etched surface of the aluminum alloy material to thereby be integrated with each other,
   wherein the preparing of the aluminum alloy material includes:
   i) a primary processing process of treating the aluminum alloy material with an alkaline aqueous solution to which a chelating agent and a cycloamine are added; and
   ii) a secondary processing process of treating the aluminum alloy material with an acidic aqueous solution to which a chelating agent is added; and
   wherein the etched surface of the aluminum alloy material has an average inner diameter of 0.1 to 10 μm and an average surface roughness of 50 to 200 μm.

2. The method of preparing an aluminum-resin complex of claim 1, wherein the chelating agent is added in a range of 0.001 to 0.5 parts by weight based on 100 parts by weight of the alkaline or acidic aqueous solution.

3. The method of preparing an aluminum-resin complex of claim 1, wherein the cycloamine is added in a range of 0.001 to 0.2 parts by weight based on 100 parts by weight of the alkaline aqueous solution.

4. The method of preparing an aluminum-resin complex of claim 1, wherein the primary processing process, the secondary processing process, or the primary and secondary processing processes becomes a unit process, and the unit process is repetitively performed one time or more.

5. The method of preparing an aluminum-resin complex of claim 1, wherein in the primary processing process, a concentration of the alkaline aqueous solution is 1 to 10 wt %, a temperature is 30 to 70° C., and a processing time is 30 seconds to 2 minutes.

6. The method of preparing an aluminum-resin complex of claim 1, wherein in the secondary processing process, a concentration of the acidic aqueous solution is 5 to 30 wt %, a temperature is 40 to 80° C., and an etching time is 1 to 5 minutes.

7. The method of preparing an aluminum-resin complex of claim 1, wherein the preparing of the aluminum alloy material further includes a degreasing process as a pre-process of the primary processing process.

* * * * *